Figure 1:
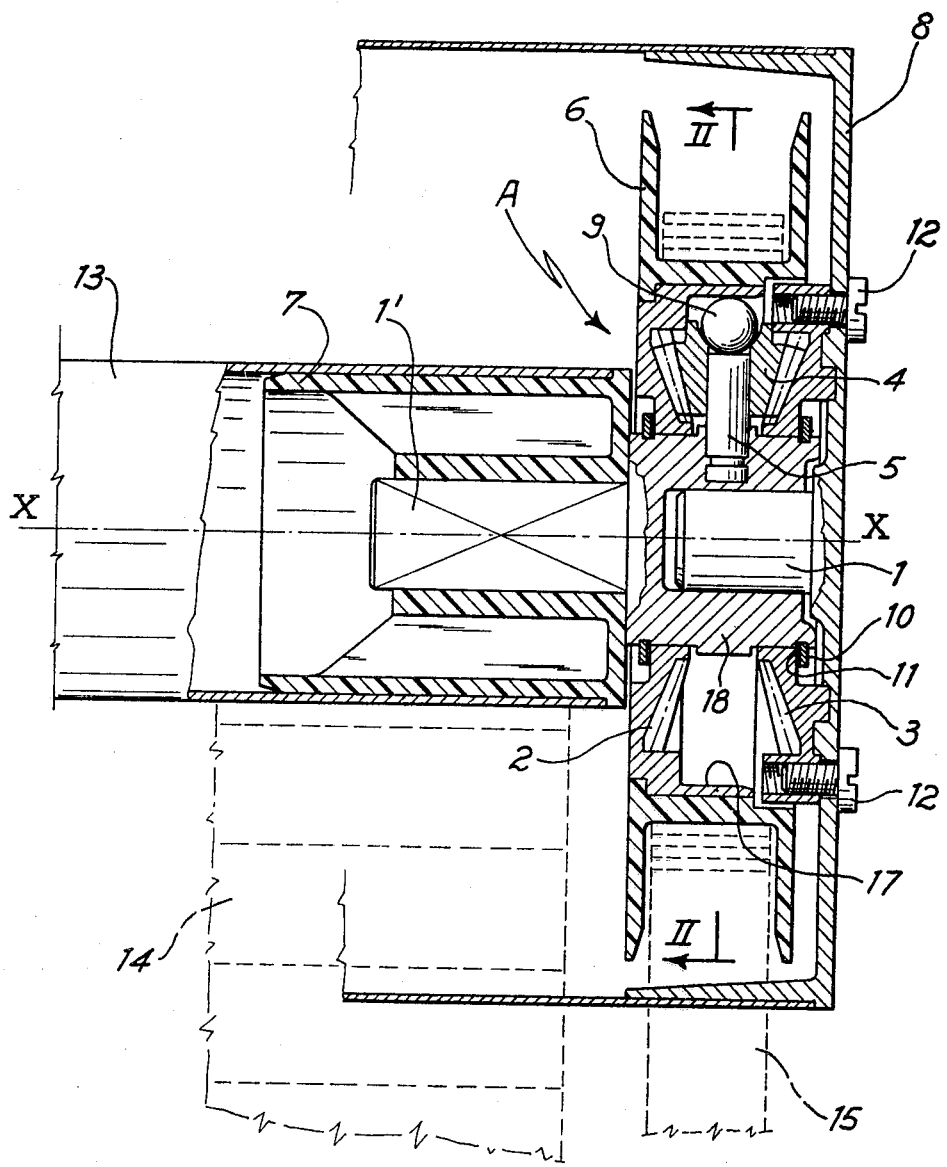

United States Patent [19]

Santambrogio

[11] 4,291,593
[45] Sep. 29, 1981

[54] TORQUE REDUCTION UNIT HAVING SMALL BEVEL GEARS, PARTICULARLY FOR THE OPERATION OF ROLLING SHUTTERS

[75] Inventor: Vincenzo Santambrogio, Cernusco sul Naviglio, Italy

[73] Assignee: IMBAC S.p.A., Milan, Italy

[21] Appl. No.: 13,480

[22] Filed: Feb. 21, 1979

[30] Foreign Application Priority Data

Dec. 20, 1978 [IT] Italy .............................. 31057 A/78

[51] Int. Cl.³ .......................... F16H 1/30; F16H 1/20; E06B 9/20
[52] U.S. Cl. ..................................... 74/799; 74/423; 160/319
[58] Field of Search ......................... 74/799, 423, 424; 160/319, 133, 8

[56] References Cited

U.S. PATENT DOCUMENTS

| 401,841 | 4/1889 | Lemieux | 74/799 X |
| 1,856,443 | 5/1932 | Stoeckicht | 74/423 |
| 2,570,151 | 10/1951 | Petersen | 74/799 |

FOREIGN PATENT DOCUMENTS

| 609438 | 2/1935 | Fed. Rep. of Germany | 74/799 |
| 359620 | 2/1962 | Switzerland | 160/319 |
| 143062 | 5/1920 | United Kingdom | 74/799 |

Primary Examiner—James Kee Chi
Attorney, Agent, or Firm—Oblon, Fisher, Spivak, McClelland & Maier

[57] ABSTRACT

A torque reduction unit having small bevel gears is described, particularly for use in the operation of rolling shutters or blinds. Due to its reduced dimensions the reduction unit is located within the operating pulley for the winding up cylinder or drum, and comprises two crown gears which are respectively integral one with the rotable pulley and the other with the stationary or fixed box, crown gears externally of a central hub carrying three or more radial pins uniformly arranged and integral with said hub, the pins having as many bevel pinions rotably carried thereon, the teeth of the pinions meshing with the teeth of the crown gears.

2 Claims, 2 Drawing Figures

TORQUE REDUCTION UNIT HAVING SMALL BEVEL GEARS, PARTICULARLY FOR THE OPERATION OF ROLLING SHUTTERS

This invention relates to a torque reduction unit of a small size, but capable of bearing considerable loads. Such a unit has been particularly devised for the operation of rolling shutters or blinds and is located is an operating pulley in a side-by-side relationship on the same axis to the winding up cylinder or drum which is thereby driven and has its speed reduced, with a corresponding reduction in the stress required for the operation.

Speed reducers have already been known for the operation of rolling shutters or blinds on winding up cylinder or drum, but such reducers are of considerable overall size, and in any case could never be incorporated within the shutter or blind operating pulley.

A speed reducer according to the present invention fully uses the inner space of the operating pulley, on which the manually operable driving element is wound up and unwound therefrom, this element directly moving the pulley and indirectly moving the shutter or blind winding cylinder or drum.

The mechanisms and gears internally of the pulley are the members reducing to one half the rotational speed which, as given to the pulley, has been transmitted to the shutter cylinder or drum through a shaft of square cross-section, this shaft axially projecting from the pulley and still axially entering centrally of the cylinder or drum to rotably drive the latter.

The actual geared motor comprises a toothed section having front teeth, which is integrally positioned in the pulley, a second toothed section facing the forming and fast with the device receiving box, and three bevel pinions at 120° to one another, rotably arranged on the bearing spindles thereof fast with the central hub.

In the accompanying drawings, the invention is schematically shown by mere way of unrestricted example according to any of the possible embodiments. Of course, any other embodiment, as inspired with the same inventive concepts, or even in a different combination providing the characteristics of the present invention, would be within the scope of the invention and accordingly within the property of the relative patent.

Figure 2:
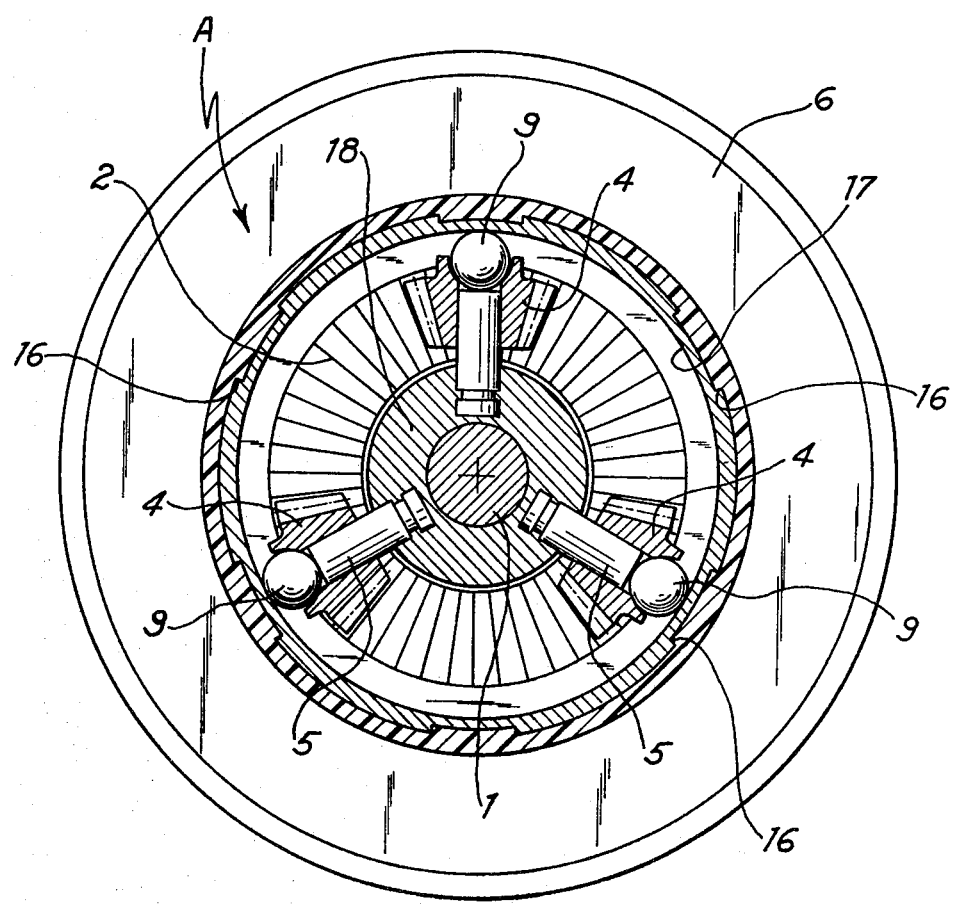

In the accompanying drawings:

FIG. 1 is an axial sectional view showing a torque reduction unit having small bevel gears according to the invention as coaxially juxtaposed to the winding up cylinder or drum; and FIG. 2 is a sectional view of the reduction unit taken along the line II—II of FIG. 1.

A reduction unit A is secured by screws 12 to the wall of box 8 carrying a pin 1 for centering thereof, while on the opposite side from the fastening wall, such a reduction unit has a strut 1' of square cross-section for insertion in a reducing and drawing bush or sleeve 7, which is fast and coaxial with the axis X—X of the cylinder or shaft 13 for the winding up of shutter or blind 14.

Two crown or ring gears are provided in said reduction unit A, of which one crown or ring gear 3 is secured to the side of box 8, while the other crown gear or moving drive crown gear 2 is inserted in a pulley 6, preferably made of plastics material and torsionally restrained thereto by fixed joints 16. Said pulley 6 is manually operated by an element 15 entrained within the pulley groove, with one end hooked or connected thereto by a nib positioned on the groove web (not shown in the drawing).

The drawn portion of the reduction unit is the central portion or rotating hub 18 on the stationary or fixed crown gear 3 on one side and carrying the movable crown gear 2 on the other side.

The assembling for the two crown gears and central hub is provided by two resilient abutting rings 10 with the aid of two steel washers 11.

In order to rotate as operated by the movable crown gear 2, said central hub 18 carries, as incorporated on the central portion and radially arranged to one another, three steel pins 5 having as many bevel pinions 4 rotating thereon which, operated by said movable crown gear 2 and resisted in the rotation thereof by said stationary or fixed crown gear 3, rotably drive said bearing hub 18. This rotation of hub 18 is effected in the same direction as the movable crown gear, but at a speed reduced by 50%.

Since bevel gears 4 free of axial abutments are involved, in order to compensate for the thrust radially received by such gears or pinions, each of the latter have on the axis thereof a ball 9 disposed from the outside and sliding on a track 17 formed internally of one of said two crown gears.

This reduction unit can be used also where a considerable load is concerned with, while being of reduced dimensions, since the transmitted stress is taken by a plurality of toothed bevel pinions and not by a single pinion, as generally occurs in conventioanl torque reduction units.

Of course, the above specified structural and dimensional features, as well as materials used could be varied without departing from the invention, depending on the different use of the reduction unit.

What I claim is:

1. A compact torque reduction unit for rolling shutters or blinds comprising:
   a stationary box;
   a first crown gear fixed to said stationary box;
   A pulley rotatable about an axis, said pulley including a radially outer circumferential surface adapted to guide a drive element;
   a second crown gear fixed to said pulley;
   at least three bevel gears engaged between said crown gears;
   a central hub rotatable about said axis and fixed to a drum of said shutters or blinds;
   a radial pin for each of said bevel gears, connected between said hub and a respective bevel gear; and
   ball bearing means seated in a radially outer portion of each of said bevel gears and engageable with an axially extending bearing surface of said pulley,
   whereby radial forces imparted upon said unit by said drive element are transmitted to said drum and said stationary box via said ball bearing.

2. A reduction gear or unit according to claim 1 wherein the gear ratio thereby obtainable is 1:2, which allows to reduce by 50% the stress required for lifting the shutter or blind.

* * * * *